(12) United States Patent
Liu et al.

(10) Patent No.: US 9,735,950 B1
(45) Date of Patent: Aug. 15, 2017

(54) BURST MODE CLOCK DATA RECOVERY CIRCUIT FOR MIPI C-PHY RECEIVERS

(71) Applicant: OMNIVISION TECHNOLOGIES, INC., Santa Clara, CA (US)

(72) Inventors: Min Liu, Fremont, CA (US); Zhizhong Xie, Shanghai (CN); Charles Qingle Wu, Palo Alto, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/296,344

(22) Filed: Oct. 18, 2016

(51) Int. Cl.
*H04L 7/00* (2006.01)

(52) U.S. Cl.
CPC .......... *H04L 7/0087* (2013.01); *H04L 7/0037* (2013.01)

(58) Field of Classification Search
USPC ................................................ 375/335, 374
See application file for complete search history.

(56) References Cited

U.S. PATENT DOCUMENTS

| | | | |
|---|---|---|---|
| 2009/0290672 A1* | 11/2009 | Ho | H03L 7/0814 375/374 |
| 2016/0337117 A1* | 11/2016 | Liu | H04L 7/0276 |
| 2016/0344378 A1* | 11/2016 | Saito | H03K 5/1508 |
| 2017/0032757 A1* | 2/2017 | Itoigawa | H03L 7/00 |
| 2017/0060218 A1* | 3/2017 | Zhang | G06F 1/08 |

* cited by examiner

*Primary Examiner* — Eva Puente
(74) *Attorney, Agent, or Firm* — Christensen O'Connor Johnson Kindness PLLC

(57) ABSTRACT

An example burst mode clock data recovery circuit may include a clock recovery circuit coupled to receive a plurality of data signals, and provide a recovered clock signal in response. Each of the plurality of data signals includes data and an embedded clock signal, and the plurality of data signals may be based on an encoded symbol. The clock recovery circuit is coupled to generate the recovered clock signal in response to a first one of the plurality of data signals. A data recovery circuit may be coupled to receive the plurality of data signals and the recovered clock signal, and provide a plurality of recovered data signals in response to the recovered clock signal. The data recover circuit is coupled to delay each of the plurality of data signals, and capture each of the delayed plurality of data signals in response to the at least one clock pulse.

23 Claims, 5 Drawing Sheets

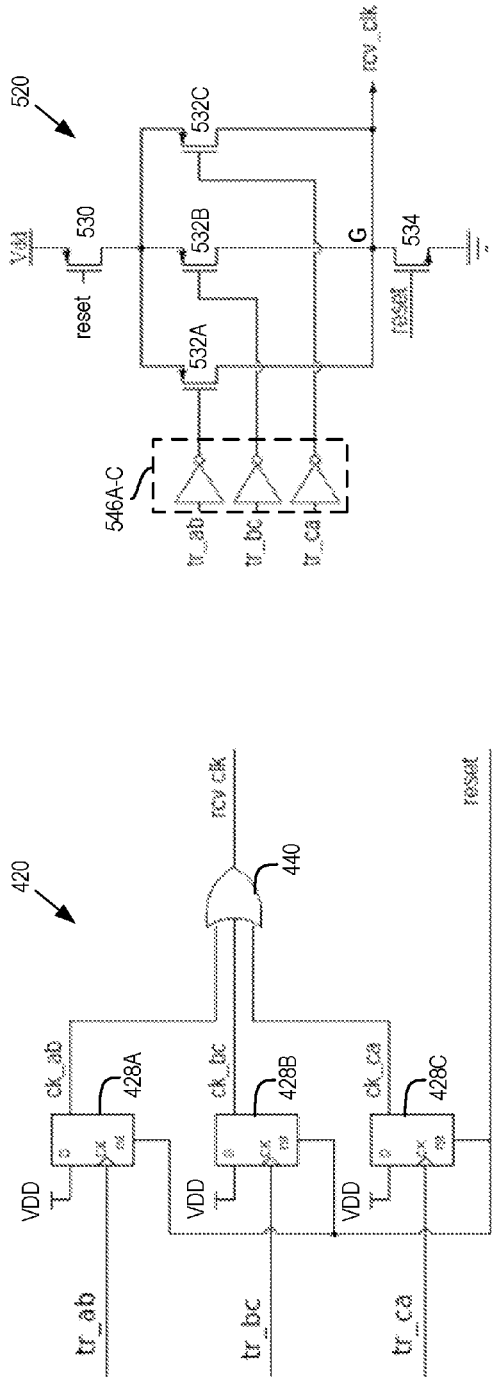
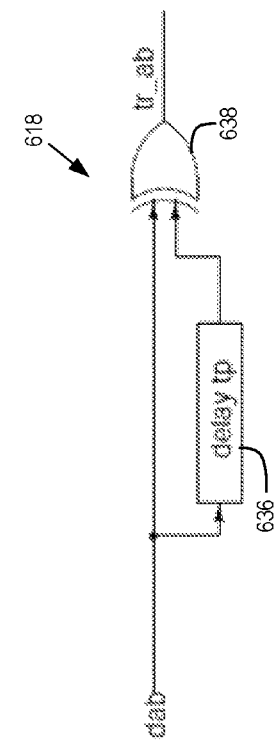
FIG. 5
FIG. 6
FIG. 4

US 9,735,950 B1

BURST MODE CLOCK DATA RECOVERY CIRCUIT FOR MIPI C-PHY RECEIVERS

TECHNICAL FIELD

This disclosure relates generally to high-speed serial interfaces, and in particular but not exclusively, relates to high-speed serial interfaces conforming to the MIPI C-PHY standard.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

The integration of these devices into mobile devices along with the increase in data bandwidth requirements has resulted in the development of different data transfer protocols. The different data transfer protocols may define higher transfer rates. The higher transfer rates, however, may necessitate changes to the image sensors, at least with regards to receiver and transmitter circuits. For example, differential signaling may be replaced with a trio of data signals that may be used to transfer encoded symbols formed by the various signals on a trio of wires. To implement such new protocols, as noted, the image sensors may need to account for the encoding and the additional bus wires.

BRIEF DESCRIPTION OF THE DRAWINGS

Non-limiting and non-exhaustive examples of the invention are described with reference to the following figures, wherein like reference numerals refer to like parts throughout the various views unless otherwise specified.

FIG. 4 is an example of a clock generator circuit in accordance with an embodiment of the present disclosure.

FIG. 5 is an example of a clock generator circuit in accordance with an embodiment of the present disclosure.

FIG. 6 is an example pulse generation circuit in accordance with an embodiment of the present disclosure.

Figure 1:
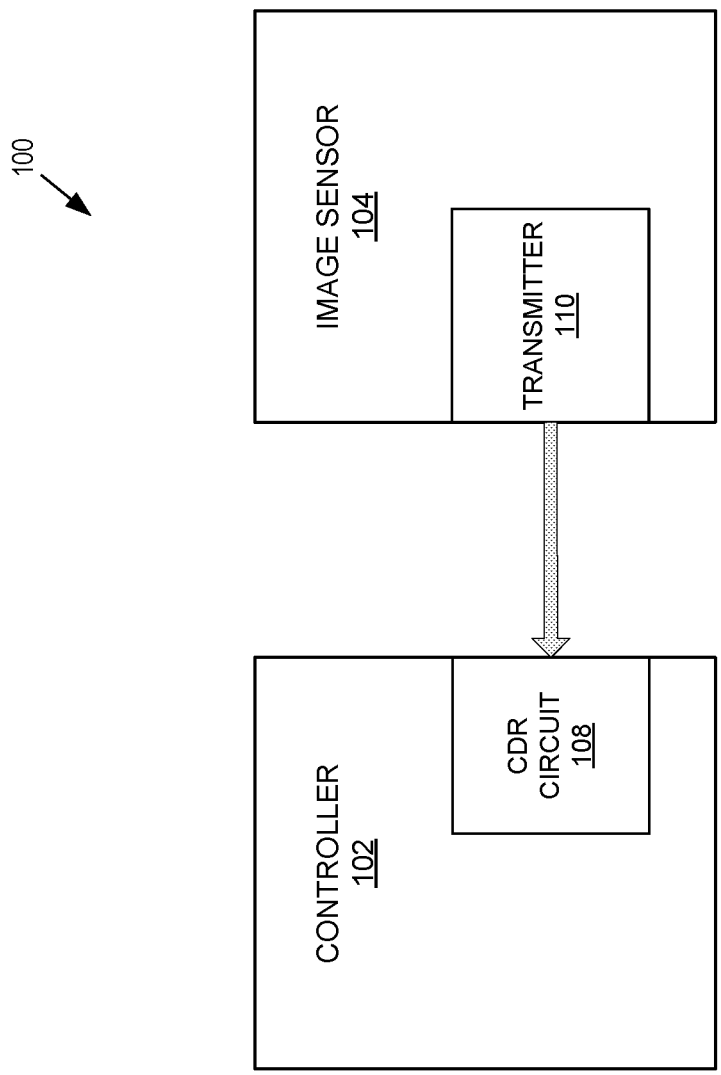
FIG. 1 is an example system in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for a high-speed serial interface with clock data recovery circuit are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 is an example system 100 in accordance with an embodiment of the present disclosure. Example systems may include portable phones, digital cameras, portable computers, and the like. In general, example computing systems may include a controller, e.g., system on a chip (SoCs), processing cores, etc., in communication with peripheral devices over a communication bus. An example peripheral device may be an image sensor. The controller may control the overall operation of the system 100, for example. In some embodiments, the system 100 may conform to the mobile industry processing interface (MIPI) C-PHY standard, which defines how data, bits for example, are communicated over a bus. Further, the MIPI C-PHY standard outlines the use of sending data as encoded symbols that transfers at least 2 times more data than does a differential signaling protocol, such as D-PHY.

The illustrated embodiment of the system 100 includes a controller 102 coupled to an image sensor 104 via the bus 106. The controller 102 and the image sensor 104 may communicate with each other over the bus 106. While the system 100 is only shown to include the controller 102 and the image sensor 104, the system 100 may additionally include various other peripheral components, such as solid state storage drives, monitors, and sensors, to name just a few, which may all be coupled to the bus 106.

The controller 102 may be a central processing unit and main controller of the system 100. In general, the controller 102 may control some aspects of the image sensor 104 during operation. For example, the controller 102 may provide control commands to and receive data from the image sensor 104 at various times during operation of the system 100. The controller 102 may, for example, be a SoC, one or more central processing units, one or more microcontrollers, and the like. In general, the controller 102 may receive data signals that include information, for example, from the image sensor 104 over the bus 106. The information, which may include image data for example, may be provided to the controller 102 for storing, display, and/or manipulation by a user. In some embodiments, the data signals may take the form of a sequence of symbols that conform to the MIPI C-PHY protocol.

The C-PHY protocol may cover data encoding using a three-wire bus instead of, for example, a two-wire bus. Each symbol may have both data and a clock signal encoded and transported together in a single trio of wires, which may also be referred to as a channel. There may be at least one transition, e.g., high-to-low or low-to-high, at each symbol boundary, e.g., a leading edge of the symbol. Each symbol may be referred to as a unit interval. The boundary transition may ease data and/or clock recovery. The encoding of the symbols may allow for up to 2.28 bits to be encoded onto each symbol, which may provide 16 bits in seven symbols. As noted, the embedded clock signal may be recovered from a leading edge of each symbol, and the embedded clock signal may then be used to capture the encoded data. The leading edge of each symbol may be provided on any of the three wires of the channel. To ensure the data is captured when it is stable, the data signals on each wire may be delayed before the embedded clock pulse is used to capture the data signals. As such, in some embodiments, the bus 106 may include three wires to carry the C-PHY compliant symbols between the controller 102 and the image sensor 104.

The illustrated embodiment of the controller 102 includes a clock data recovery (CDR) circuit 108. CDR 108 may be coupled to the bus 106 to receive the three data signals that form the encoded symbol, for example. In some embodiments, CDR 108 may be coupled to the bus 106 via one or more receiver circuits (not shown), which may convert the voltage signals on or between the three wires of the bus 106 into binary signals, e.g., "1s" and "0s." The CDR 108 may recover the clock signal from at least one of the data signals and use the recovered clock signal to capture, e.g., latch, the data in the three data signals. The recovered clock signal and the data may then be provided to other circuits and functional blocks of the controller 102.

The illustrated embodiment of the image sensor 104 may include a transmitter 110 coupled to transmit one or more encoded symbols to the controller 102. The transmitter 110 may include one or more driver circuits coupled to the bus 106, with a different/separate driver circuit coupled to provide one of the three data signals, for example. The image sensor 104 may provide image data and/or operating information to the controller 102 either in response to a received command or an internal prompt.

Figure 2:
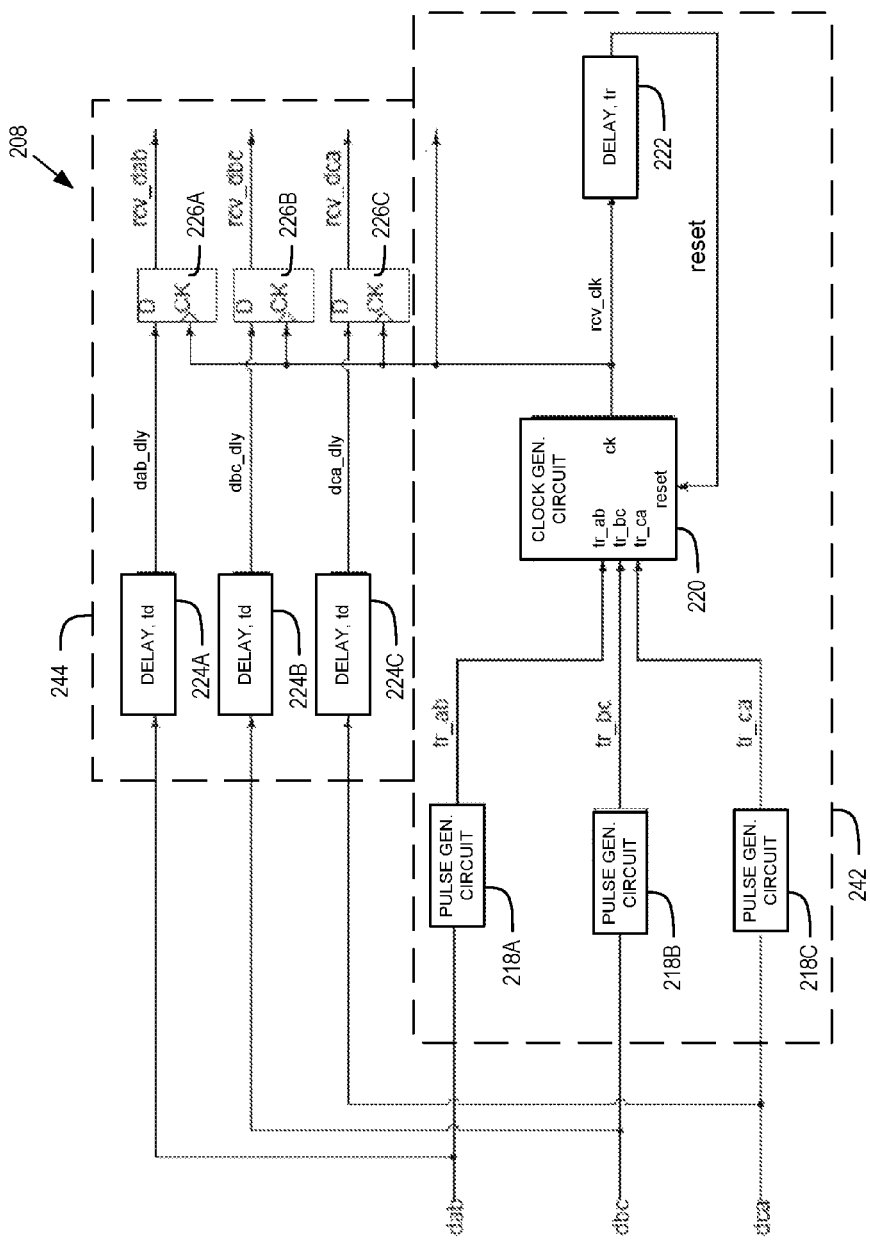
FIG. 2 is an example block diagram of a clock data recovery circuit in accordance with an embodiment of the present disclosure.

FIG. 2 is an example block diagram of a clock data recovery circuit 208 in accordance with an embodiment of the present disclosure. CDR 208 may be an example of the CDR 108 and/or 208. CDR 208 may, in general, recover an embedded clock signal and three data signals encoded into a symbol formed by an image sensor, for example, based on the MIPI C-PHY standard. The recovered clock data may be used by the CDR 208 to capture the data signals. The recovered data and clock signal may be provided as outputs by the CDR 208.

The illustrated embodiment of the CDR 208 includes two portions—a clock recovery circuit 242 and a data recovery circuit 244. Three data signals dab, dbc, and dca may be received by the CDR 208 from one or more receivers, for example. Each of the three data signals may provide data in binary format, and the combination of three data signals may provide an embedded clock signal. The embedded clock signal may be based on which of the three data signals is received first for each symbol. As such, the data signal received first in each symbol may be different. For example, data signal dab may transition high in a first symbol before either of the other two data symbols transition high. In a subsequent symbol, data signal dca may transition low before either of the other two transition low. Accordingly, in some embodiments, the first data signal of the three data signals to transition high or low may provide the timing.

The clock recovery circuit 242 may recover the embedded clock signal embedded in at least one of the data signals dab, dbc, and dca, and then provide a recovered clock signal rcv_clk to the data recovery circuit 244. In response, the data recovery circuit may capture the data included in the three data signals, and provide the same as recovered data signals rcv_dxx. The recovered clock signal and the recovered data signals may be provided to subsequent circuits, for example.

The illustrated embodiment of the clock recovery circuit 242 includes a plurality of pulse generation circuits 218, a clock generator circuit 220, and a delay circuit 222. The plurality of pulse generation circuits 218 may include three pulse generation circuits 218A, 218B and 218C, and each of the pulse generation circuits 218 may be coupled to receive a respective data signal dxx, where dxx may be one of dab, dbc, or dca. For example, pulse generation circuit 218A may be coupled to receive data signal dab, pulse generation circuit 218B may be coupled to receive data signal dbc, and pulse generation circuit 218C may be coupled to receive data signal dca. Each of the pulse generation circuits 218 may provide a respective pulse signal tr_xx in response to a rising edge and/or a falling edge of the received data signal. For example, pulse generation circuit 218A may provide pulse signal tr_ab on a rising edge and a falling edge of the data signal dab, pulse generation circuit 218B may provide pulse signal tr_bc, and pulse generation circuit 218C may provide pulse signal tr_ca.

The clock generator circuit 220 may be coupled to receive the pulse signals tr_ab, tr_bc, and tr_ca from the plurality of pulse generation circuits 218 and provide a recovered clock signal rcv_clk in response. In some embodiments, the recovered clock signal may be a single pulse for every symbol received. In some embodiments, the clock generator circuit 220 may generate the recovered clock signal based on the first received pulse signal of a symbol. The other two pulse signals of the symbol may not generate a recovered clock signal pulse. Once the symbol has been recovered, the clock generator circuit 220 may be reset in response to a reset signal. After being reset, the clock generator circuit 220 may be ready to generate a subsequent clock signal pulse from a subsequent symbol.

The delay 222 may be coupled to receive the recovered clock signal rcv_clk from the clock generator circuit 220 and provide a delayed version of the recovered clock signal in response. The delayed version of the recovered clock signal may be the reset signal. The delay 222 may delay the recovered clock signal pulse a delay amount of tr. The length of the delay tr may desirably long enough to prevent a clock pulse to be generated from the second or third data signals of a symbol received by the clock recovery circuit 242, but at the same time short enough so that the clock generator circuit 220 is reset before the data signals of a subsequent symbol are received. Setting the delay tr as such may ensure that only one clock pulse of the recovered clock signal is generated per symbol. Accordingly, the data in the data signals may be recovered only once as well, and no redundant data may be captured or recovered.

The delay 222 may be any tunable delay circuit known in the art. For example, the delay 222 may be a delay locked loop (DLL), a series of inverters or buffers, etc.

The illustrated embodiment of the data recovery circuit 244 includes a plurality of delays 224 and a respective plurality of latches 226. The plurality of delays 224 may include at least one delay per data signal. For example, a delay 224A may delay the data signal dab and provide delayed data signal dab_dly as an output. The other two data signals dbc and dca may similarly be delayed by a respective delay 224B, 224C and provided as delayed data signals accordingly. The delay amount td of each of the plurality of delays 224 may desirably delay the data signals to satisfy both the hold time and the set up time of the plurality of latches 226. Additionally, the delay td of each of the plurality of delays 224 may be set to ensure that the recovered clock signal pulse occurs in a stable region of the data signals.

The plurality of latches 226 may receive the delayed versions of the data signals, latch the same based on the recovered clock signal, and provide the same as recovered data signals. For example, the latch 226A may be coupled to receive the delayed data signal dab_dly and latch the same based on the recovered clock signal provided by the clock recovery circuit 242, and provide the recovered data signal rcv_dab. Likewise, latches 226B and 226C may be coupled similarly to provide recovered data signal rcv_dbc and rcv_dca, respectively. In some embodiments, the plurality of latches may be D flip flops coupled to receive the delayed data signals at a data input and coupled to receive the recovered clock signal at a clock input. The delay td of the plurality of delays 224 may be adjusted based on the type of latch used for the plurality of latches 226.

Figure 3:
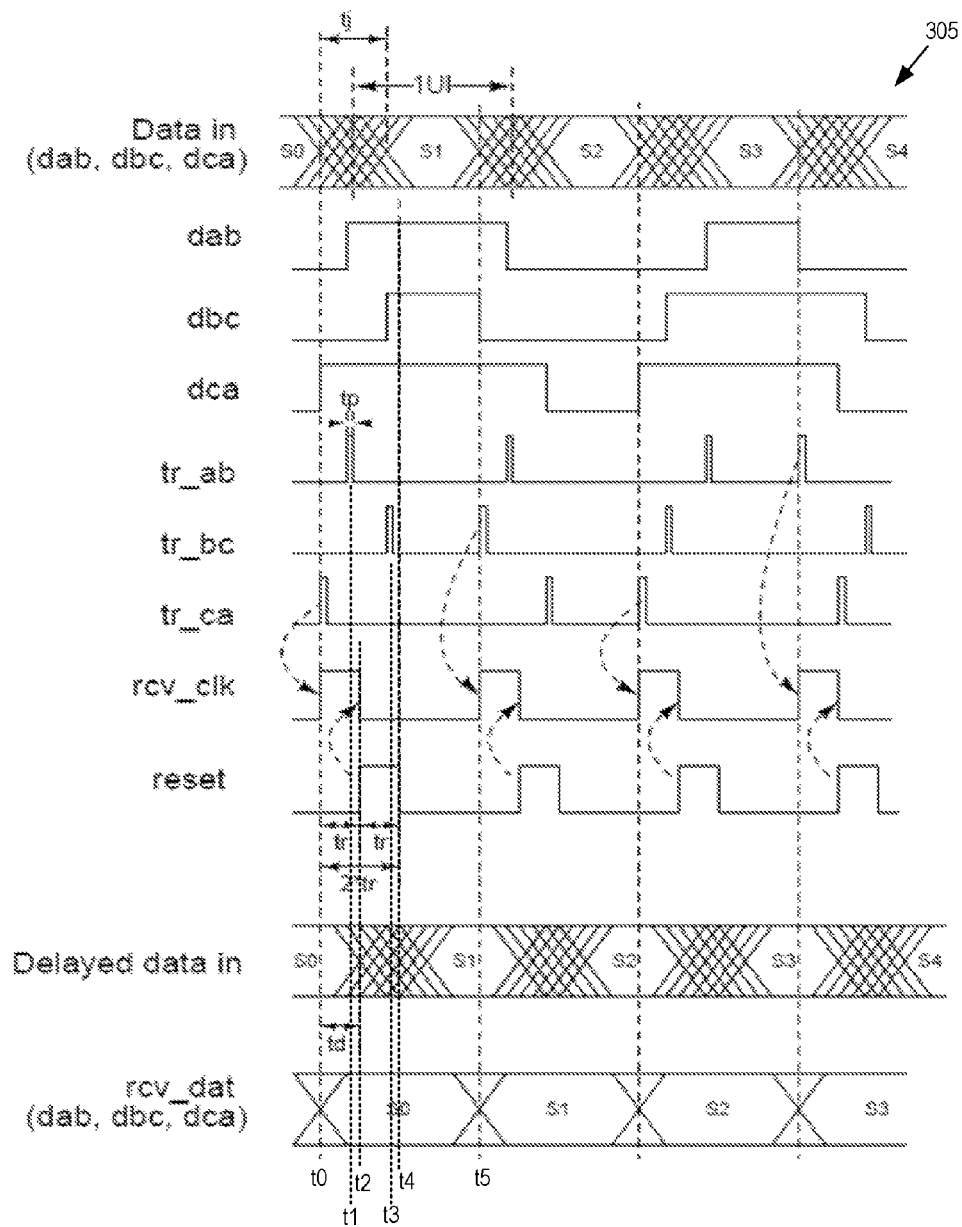
FIG. 3 is an example timing diagram in accordance with an embodiment of the present disclosure.

FIG. 3 is an example timing diagram 305 in accordance with an embodiment of the present disclosure. Timing diagram 305 may be used to illustrate an example operation of CDR 208. The timing diagram 305 includes and shows the relationship between the data signals dab, dbc, and dca (shown at top), the pulse signals generated by the plurality of pulse generator circuits 218, the recovered clock signal rcv_clk, the reset signal, the delayed data provided by the plurality of delays 224, and the recovered data rcv_dat.

For example, a first symbol s0 may be received by the CDR 208. The first symbol may include the three data signals dab, dbc, and dca. Transitions (high-to-low or low-to-high) occurring in each of the three data signals may be received in a sequential order in each arriving symbol, but the specific order may differ for each symbol. It should be noted that the transitions may mark the edges of a unit interval, and the length of time of the transitions may be referred to a time of jitter of the data signals. For example, data signal dca may be the first data signal to transition, which occurs at time t0 with a transition from low-to-high. The transition of dca occurring at time t0 may generate a pulse signal tr_ca via the pulse generation circuit 218C. The clock generator circuit 220 may receive the pulse tr_ca and generate a clock pulse rcv_clk at time t0, as well. The clock pulse rcv_clk may be provided to the plurality of latches 226 and to the delay 222.

At time t2, the reset signal may transition high, which may reset the clock generator circuit 220. The reset signal may be provided by the delay 222. The length of time of the clock pulse rcv_clk may be based on the delay tr of the delay 222. As such, the pulse width of rcv_clk may be tr. The width of the reset signal may likewise be tr due to the delay of the delay 222. As such, it may be desirable to have the length of 2*tr to not interfere with the acquisition of a subsequent symbol.

Additionally, at times t1 and t3 pulse signals tr_ab and tr_bc may be generated by respective ones of the plurality of pulse generation circuits 218. These pulses, however, may not cause the clock generator circuit 220 to generate a clock pulse. For example, the pulse signal tr_ab may be received by the clock generator circuit 220 while the clock generator circuit 220 is currently providing a high output, e.g., the clock signal rcv_clk. As such, a clock signal may not be generated due to tr_ab. Further, the pulse signal tr_bc may be received by the clock generator circuit 220 while the reset signal is asserted high. As a result, tr_bc may not cause the clock generator circuit 220 to generate a clock pulse.

At time t4, however, the reset signal may transition low, which may allow the clock generator circuit 220 to generate a clock pulse rcv_clk upon receiving a subsequent pulse signal. For example, at time t5 the pulse signal tr_bc may cause the clock generator circuit 220 to generate a clock pulse rcv_clk.

As for the data, the plurality of delays 224 delay the data signals dab, dbc, and dca a delay amount of td. The delay of td, as noted, should be based on the hold and set up time of the receiving plurality of latch circuits 226. As such, due to the delay, the data signals may be latched at time t0 based on the clock signal rcv_clk. In some embodiments, the plurality of latches 226 may provide the recovered data signals rcv_dat until the next clock pulse at time t5.

FIG. 4 is an example of a clock generator circuit 420 in accordance with an embodiment of the present disclosure. The clock generator circuit 420 may be an example of the clock generator circuit 220. The clock generator circuit 420 may generate and provide a clock pulse based on receiving a plurality of pulse signals tr_ab, tr_bc, and tr_ca. In some embodiments, the clock generator circuit 420 may provide a recovered clock signal rcv_clk in response to one of the pulse signals, such as a first pulse signal. The pulse signals may be generated by one or more pulse generations circuits in response to data signals that form an encoded symbol. For example, a MIPI C-PHY compliant symbol may include three data signals dab, dbc, and dca, which may be received by the plurality of pulse generation circuits 218 and provide the pulse signals tr_ab, tr_bc, and tr_ca in response.

The illustrated embodiment of the clock generator circuit 420 includes a plurality of flip flops 428, such as the flip flops 428A-C, and an OR gate 440. The plurality of flip flops 428, which may be D flip flops in some embodiments, may be coupled to receive respective pulse signals tr_ab, tr_bc, and tr_ca on their clock inputs. The data inputs of the plurality of flip flops 428 may be coupled to a high reference voltage. When one of the plurality of flip flops 428 is triggered by an incoming pulse signal, the triggered flip flop may provide a high output ck_xx in response, such as ck_ab, ck_bc, and ck_ca. The high output may remain until a reset signal is received by the plurality of flip flops 428. The outputs of the plurality of flip flops 428 may be coupled to an input of the OR gate 440.

For example, a pulse signal tr_bc may be received by the flip flop 428B, which may cause the output ck_bc to transition high. The output ck_bc may be coupled to an input of the OR gate 440, which may provide the recovered clock signal rcv_clk in response. Before the reset signal is received by the plurality of flip flops 428, the signal ck_bc, and in turn, the signal rcv_clk may remain high due to the unchanging nature of the high reference voltage coupled to the data input of the flip flop 428B. Upon receipt of the reset signal, which may be a delayed version of the recovered clock signal rcv_clk provided by a delay, such as the delay 222, the output of the flip flop 428B may transition low. As such, the recovered clock signal rcv_clk may likewise transition low.

While one of the plurality of flip flops 428 is providing a high output signal ck_xx, receipt of a pulse signal by any of the other flip flops 428 may not cause additional clock pulses to be output by the clock generator circuit 420. The lack of additional clock pulses due to additional pulse signals may be due to the OR gate 440. Because the output of the OR gate 440 may transition high in response to a single high input, additional high inputs subsequently received may not change or affect the output of the OR gate 440. As such, the output rcv_clk of the OR gate 440 may not change due to receiving an additional high signal. Further, none of the plurality of flip flops 428 may provide a signal ck_xx while the reset signal is asserted. As such, the clock generator circuit 420 may only provide a clock pulse due to a first pulse signal received.

FIG. 5 is an example of a clock generator circuit 520 in accordance with an embodiment of the present disclosure. The clock generator circuit 520 may be an example of the clock generator circuit 220. The clock generator circuit 520 may generate and provide a clock pulse based on receiving a plurality of pulse signals tr_ab, tr_bc, and tr_ca. In some embodiments, the clock generator circuit 520 may provide a recovered clock signal rcv_clk in response to one of the pulse signals, such as a first pulse signal received. The pulse signals may be generated by one or more pulse generations circuits in response to data signals that form an encoded symbol. For example, a MIPI C-PHY compliant symbol may include three data signals dab, dbc, and dca, which may be received by the plurality of pulse generation circuits 218 and provide the pulse signals tr_ab, tr_bc, and tr_ca in response.

The illustrated embodiment of the clock generator circuit 520 includes a plurality of inverters 546, a plurality of transistors 530, 532, and 534. The plurality of inverters 546 may include three inverters 546A, 546B, and 546C. Inputs of the plurality of inverters may be coupled to receive a respective data signal, and outputs of the plurality of inverters may be coupled to a gate of a respective one of the transistors 532. Each of the plurality of inverters 546 may invert a respective one of the pulse signals tr_ab, tr_bc, and tr_ca, and provide an inverted version of the same as an output. The pulse signals may be provided by one or more pulse generation circuits, such as the pulse generation circuits 218. In some embodiments, the pulse signals tr_ab, tr_bc, and tr_ca may be provided in an inverted form, and in such an embodiment, the plurality of inverters may 546 be omitted.

The transistor 530, which may be a p-channel MOSFET, may be coupled between a high reference voltage Vdd and a source of each of the plurality of transistors 532. A gate of the transistor 530 may be coupled to receive the reset signal, which may reset the clock generator circuit 520.

The plurality of transistors 532, which may be p-channel MOSFETs, may be coupled between the transistor 530 and a node G. Each of the plurality of transistors 532 may be coupled to the transistor 530 at their respective source terminal and coupled to node G at their respective drain terminal. Additionally, a gate of each of the plurality of transistors 532 may be coupled to a respective one of the plurality of inverters 546. For example, the gate of the transistor 532A may be coupled to an output of the inverter 546A. Gates of the transistors 532B and 532C may be similarly coupled.

The transistor 534, which may be an n-channel MOSFET, may be coupled to node G at a drain and to ground at a source. A gate of the transistor 534 may be coupled to receive the reset signal. Voltages on node G may provide the recovered clock signal rcv_clk.

In operation, the clock generator circuit 520 may receive a sequence of pulse signals tr_ab, tr_bc, and tr_ca. The first pulse signal of the sequence of pulse signals may turn on, e.g., enable, a respective one of the plurality of transistors 532, which may cause the high reference voltage Vdd to be coupled to node G. The coupling of Vdd to node G may result in a high voltage being provided as the recovered clock signal rcv_clk, which may remain high until the reset signal enables transistor 534. When transistor 534 is enabled, node G may be coupled to ground. At the same time, PMOS transistor 530 is disabled. Additionally, while node G is coupled to ground, the turn on of any of the plurality of transistors 532 may not affect recovered clock signal since transistor 530 is disabled.

FIG. 6 is an example pulse generation circuit 618 in accordance with an embodiment of the present disclosure. The pulse generation circuit 618 may be an example of one of the plurality of pulse generation circuits 218. The pulse generation circuit 618 may be coupled to receive a data signal, dab for example, and provide a pulse signal, tr_ab for example, in response.

The illustrated embodiment of the pulse generation circuit 618 includes a delay 636 and an exclusive OR (XOR) gate 638. The XOR gate 638 may be a two input logic gate with one input coupled to receive the data signal dab and the other input coupled to receive the output of the delay 636. The delay 636 is coupled to receive the same data signal dab, delay the data signal, and provide a delayed version of the data signal as an output. The output of the XOR gate 638 may be a pulse having a width based on the delay tp of the delay 636. Because the pulse signal tr_ab is desirably only generated at a falling and/or rising edge of the data signal, the XOR gate 638 may only provide the pulse signal when the two input signals are at different logic levels.

Figure 7:
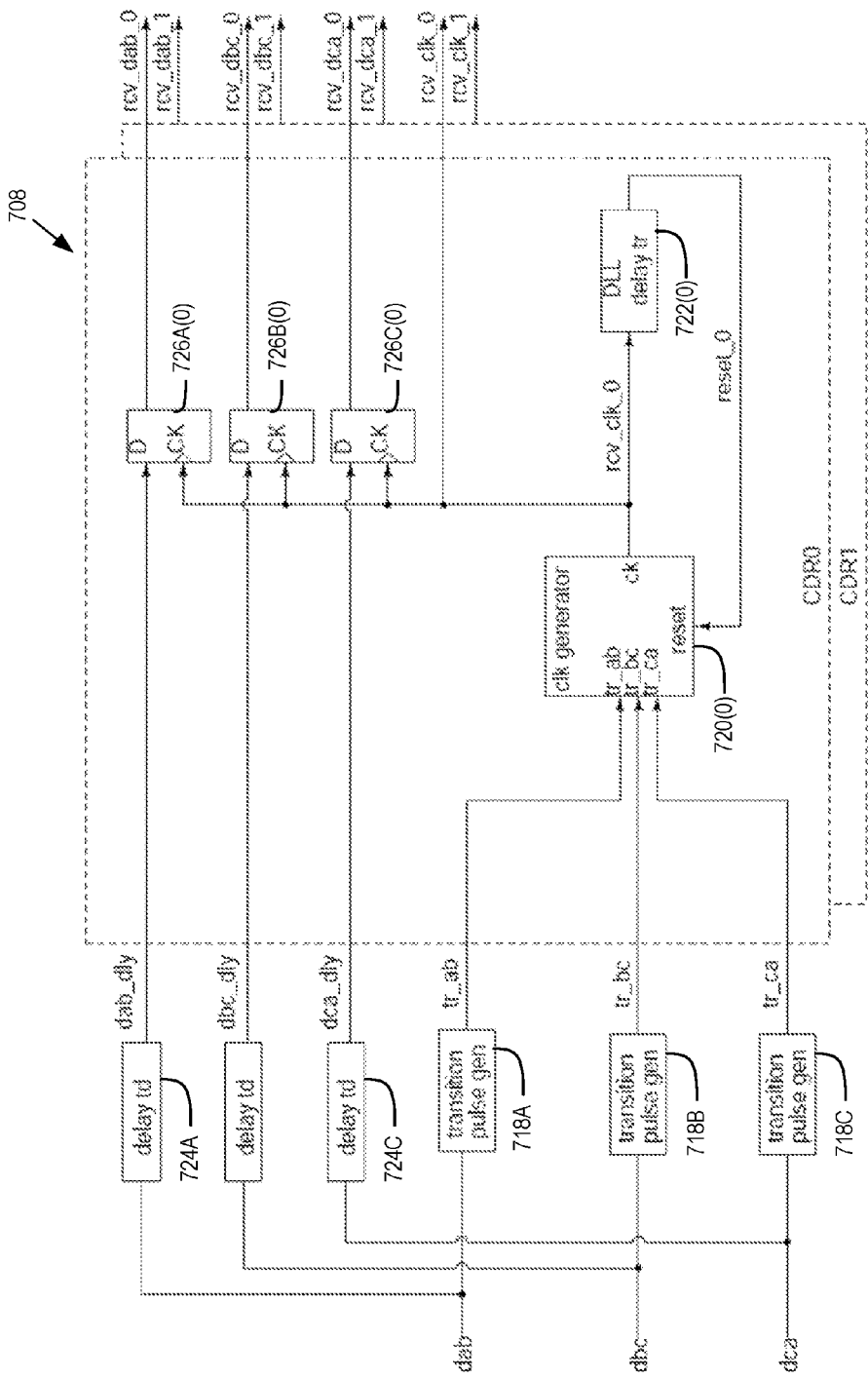
FIG. 7 is an example block diagram of a clock data recovery circuit in accordance with an embodiment of the present disclosure.

FIG. 7 is an example block diagram of a clock data recovery circuit 708 in accordance with an embodiment of the present disclosure. CDR 708 may be an example of CDR 108 and/or 208. The CDR 708 may include a plurality of CDR circuits coupled to recover and interleave received symbols. For example, if there are N CDR circuits, then each CDR circuit may recover the clock and data of every Nth symbol. Additionally, using multiple CDR circuits may allow the delay of the delay tr to be relaxed, e.g., increased, so that there is less constraint on resetting the CDR circuit before each symbol.

The illustrated embodiment of the CDR 708 includes a plurality of pulse generation circuits 718, and a plurality of delays 724 shared between a plurality of remaining portions of CDR circuits, such as CDR0 and CDR1. Because the plurality of pulse generation circuits 718 and the plurality of delays 724 may not need to be reset between symbols, they may be shared between each of the CDR circuits.

Each CDR circuit, however, may include a clock generation circuit, a delay, and a plurality of latches. For example, CDR0 includes clock generator circuit 720(0), delay 722(0), and a plurality of latches 726(0). CDR1 includes similar components. While only two CDR circuits are shown, any number of CDR circuits are contemplated.

In some embodiments, the delay of delay 722 may be increased to half of a unit interval (see FIG. 3). As such, CDR0 may not be reset until a subsequent symbol is received. However, since the subsequent symbol may be captured by CDR1, CDR0 may not need to be available until a third symbol. For example and with respect to FIG. 3, CDR0 may capture s0, CDR1 may capture s1, and so on. Accordingly, the two CDR circuits may interleave the recovered data and recovered clock signal.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An apparatus, comprising:
  a clock recovery circuit coupled to receive a plurality of data signals, and provide a recovered clock signal in response, wherein each of the plurality of data signals includes data and an embedded clock signal, wherein the plurality of data signals is based on an encoded symbol, and wherein the clock recovery circuit is coupled to:
    generate the recovered clock signal in response to a first one of the plurality of data signals, wherein each of the plurality of data signals are sequentially received; and
    provide at least one clock pulse of the recovered clock signal in response to the first one of the plurality of data signals; and
  a data recovery circuit coupled to receive the plurality of data signals and the recovered clock signal, and provide a plurality of recovered data signals in response to the recovered clock signal, wherein the data recover circuit is coupled to:
    delay each of the plurality of data signals; and
    capture each of the delayed plurality of data signals in response to the at least one clock pulse.

2. The apparatus of claim 1, wherein the clock recovery circuit comprises:
  a plurality of pulse generation circuits coupled to receive a respective one of the plurality of data signals, and provide a plurality of pulse signals in response, wherein the plurality of pulse signals follows the sequential order in which the plurality of data signals is received, and wherein a first one of the plurality of pulse signals is provided in response to the first one of the plurality of data signals;
  a clock generator circuit coupled to receive the plurality of pulse signals and provide the at least one clock pulse in response to the first one of the plurality of pulse signals received, and further coupled to be reset in response to a reset signal; and
  a delay coupled to receive the at least one clock pulse, delay the at least one clock pulse a first delay amount, and provide the reset signal in response.

3. The apparatus of claim 2, wherein the clock generator circuit comprises:
  a plurality of flip flops coupled to receive a respective one of the plurality of pulse signals at a respective clock input, wherein a data input of each of the plurality of flip flops is coupled to a high reference voltage and a reset input is coupled to receive the reset signal, and further coupled to provide a respective signal pulse in response; and
  an OR gate coupled to receive the signal pulses from each of the plurality of flip flops, and to provide the recovered clock signal in response.

4. The apparatus of claim 2, wherein the clock generator circuit comprises:
  a plurality of inverters coupled to receive a respective one of the plurality of pulse signals and provide a respective inverted pulse signal in response;
  a plurality of transistors coupled between a high reference voltage at a source via a first reset transistor and a first node at a drain, and further coupled to receive a respective one of the inverted pulse signals at a gate; and
  a second reset transistor coupled to the first node at a drain and coupled to ground at a source, and further coupled to receive the reset signal at a gate,
  wherein the first one of the clock pulses enables the respective one of the plurality of transistors to couple the high reference voltage to the first node, wherein the first node is an output of the clock generator circuit, and wherein the coupling of the high reference voltage to the first node provides the recovered clock signal.

5. The apparatus of claim 4, wherein the plurality of transistors are p-channel transistors, and the first reset transistor is a p-channel transistor and the second reset transistor is an n-channel transistor.

6. The apparatus of claim 1, wherein the data recovery circuit comprises:
  a plurality of delays coupled to receive a respective one of the plurality of data signals, delay the respective data signals a delay amount, and provide respective delayed data signals in response; and
  a plurality of latches coupled to receive respective delayed data signals on a data input and the recovered clock signal on a clock input, and further coupled to latch the delayed data signals in response to the recovered clock signal and provide the delayed data signals as the recovered data signals.

7. The apparatus of claim 6, wherein the plurality of latches are D flip flops.

8. The apparatus of claim 1, wherein the encoded symbol conforms to a MIPI C-PHY standard.

9. An apparatus, comprising:
  a plurality of pulse generator circuits, each of the plurality of pulse generator circuits coupled to receive a respective one of a plurality of data signals and provide a plurality of pulse signals in response, wherein the plurality of data signals from an encoded symbol, and wherein each of the plurality of data signals arrive at different times;
  a clock generator circuit coupled to receive the plurality of pulse signals, and provide a clock pulse in response to at least a first one of the pulse signals received, wherein the clock generator is reset in response to a reset signal;
  a delay coupled to receive the clock pulse, delay the clock pulse a first delay amount, and provide a delayed clock pulse to the clock generator as the reset signal;
  a plurality of delay circuits, each of the plurality of delay circuits coupled to receive a respective one of the plurality of data signals and provide a delayed data signal in response; and a plurality of latch circuits, each of the plurality of latch circuits coupled to receive a respective one of the delayed data signals, latch the respective one of the plurality of data signals in response to the clock pulse, and provide the respective one of the plurality of data signals as a respective recovered data signal.

10. The apparatus of claim 9, wherein the clock generator circuit comprises:
a plurality of flip flops coupled to receive respective pulse signals from a respective one of the plurality of pulse generator circuits at a clock input of each of the plurality of flip flops, and further coupled to a high reference voltage at a data input, and wherein each of the plurality of flip flops provide an output to a OR gate, wherein an output of the OR gate provides the recovered clock pulse, and
wherein each of the plurality of flip flops are reset in response to the reset signal.

11. The apparatus of claim 9, wherein the clock generator circuit comprises:
a plurality of inverters coupled to receive respective pulse signals from a respective one of the plurality of pulse generator circuits, and provide an inverted version of the respective pulse signals in response;
a plurality of first transistors coupled to receive a respective one of the inverted versions of the pulse signals at a gate, wherein each of the plurality of first transistors are coupled between a high reference voltage via a first reset transistor and a drain of a second reset transistor, the drain of the reset transistor providing the clock pulse, and wherein a gate of the first and second reset transistors is coupled to receive the reset signal.

12. The apparatus of claim 11, wherein the plurality of first transistors and the first reset transistor are p-channel MOSFETs and the second reset transistor is an n-channel MOSFET.

13. The apparatus of claim 9, wherein the plurality of latches are D flip flops.

14. The apparatus of claim 9, wherein the encoded symbol is based on a MIPI C-PHY standard.

15. The apparatus of claim 9, wherein the encoded symbol is received over a three-wire channel, and wherein each wire carries a respective one of the discrete data signals that comprise the encoded symbol.

16. A system, comprising:
a controller coupled to receive on or more encoded symbols from an image sensor, the controller including:
a clock recovery circuit coupled to receive a plurality of data signals, and provide a recovered clock signal in response, wherein each of the plurality of data signals includes data and an embedded clock signal, wherein the plurality of data signals is based on at least one of the one or more encoded symbols, wherein the clock recover circuit is coupled to:
generate the recovered clock signal in response to a first one of the plurality of data signals, wherein each of the plurality of data signals are sequentially received; and
provide at least one clock pulse of the recovered clock signal in response to the first one of the plurality of data signals; and
a data recovery circuit coupled to receive the plurality of data signals and the recovered clock signal, and provide a plurality of recovered data signals in response to the recovered clock signal, wherein the data recover circuit is coupled to:
delay each of the plurality of data signals; and
capture each of the delayed plurality of data signals in response to the at least one clock pulse.

17. The system of claim 16, wherein the clock recovery circuit comprises:
a plurality of inverters coupled to receive respective pulse signals from a respective one of the plurality of pulse generator circuits, and provide an inverted version of the respective pulse signals in response;
a plurality of first transistors coupled to receive a respective one of the inverted versions of the pulse signals at a gate, wherein each of the plurality of first transistors are coupled between a high reference voltage via a first reset transistor and a drain of a second reset transistor, the drain of the second reset transistor providing the clock pulse, and wherein a gate of the first and second reset transistors is coupled to receive a reset signal.

18. The system of claim 17, wherein the clock recovery circuit further comprises:
a plurality of pulse generator circuits, each of the plurality of pulse generator circuits coupled to receive a respective portion of an encoded symbol and provide a pulse signal in response, the encoded symbol comprising a plurality of discrete data signals having different timing with respect to the other discrete data signals of the encoded symbol.

19. The system of claim 16, wherein the clock recovery circuit comprises:
a plurality of flip flops coupled to receive respective pulse signals from a respective one of the plurality of pulse generator circuits at a clock input of each of the plurality of flip flops, and further configured to be coupled to a high reference voltage at a data input, and wherein each of the plurality of flip flops provide an output to a OR gate, wherein an output of the OR gate provides the recovered clock pulse, and
wherein each of the plurality of flip flops are reset in response to a reset signal.

20. The system of claim 19, wherein the clock recovery circuit further comprises:
a plurality of pulse generator circuits, each of the plurality of pulse generator circuits coupled to receive a respective portion of an encoded symbol and provide a pulse signal in response, the encoded symbol comprising a plurality of discrete data signals having different timing with respect to the other discrete data signals of the encoded symbol.

21. The system of claim 16, wherein the data recovery circuit comprises:
a plurality of delay elements, each of the plurality of delay elements coupled to receive the respective portions of the encoded symbol and provide a delayed respective portion of the encoded symbol in response;
a plurality of latch circuits, each of the plurality of latch circuits coupled to receive a respective delayed portion of the encoded symbol, latch the respective delayed portion of the encoded symbol in response to the clock pulse, and provide the respective delayed portion of the encoded symbol as an output.

22. The system of claim 16, wherein the encoded symbol is compliant with a MIPI C-PHY protocol.

23. The system of claim 16, wherein the clock recovery circuit further comprises a delay circuit coupled to receive the recovered clock signal, delay the recovered clock signal and provide the recovered clock signal as a reset signal, wherein the reset signal resets the clock recovery circuit before a subsequent encoded symbol is received.

\* \* \* \* \*